W. S. OLD.
NUT LOCK.
APPLICATION FILED FEB. 3, 1912.

1,077,425.

Patented Nov. 4, 1913.

Witnesses
S. A. Matthus
Dorothy Wendland

Inventor
William S. Old
By John H. Boss
his Attorney

COLUMBIA PLANOGRAPH CO., WASHINGTON, D. C.

UNITED STATES PATENT OFFICE.

WILLIAM S. OLD, OF YOUNGSTOWN, OHIO.

NUT-LOCK.

1,077,425. Specification of Letters Patent. Patented Nov. 4, 1913.

Application filed February 3, 1912. Serial No. 675,281.

*To all whom it may concern:*

Be it known that I, WILLIAM S. OLD, a citizen of the United States of America, residing at Youngstown, in the county of Mahoning and State of Ohio, have invented certain new and useful Improvements in Nut-Locks, of which the following is a specification.

My invention relates to improvements in nut-locks of the pawl type.

The objects of my invention are to provide a nut-lock that will securely retain a nut in place when tightened against an abutment, positively resisting the tendency of the nut to back off or loosen by vibration, shocks or otherwise; to provide a simple and durable nut-lock and means to provide for depressing the pawl to release the nut when it is desired to remove the nut from its contact with the abutment.

Figure 1:
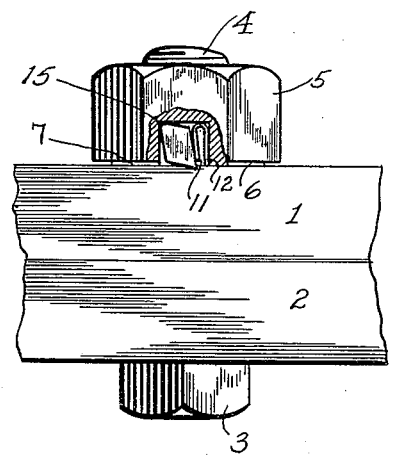
Figure 3:
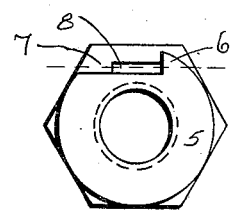
Figure 2:
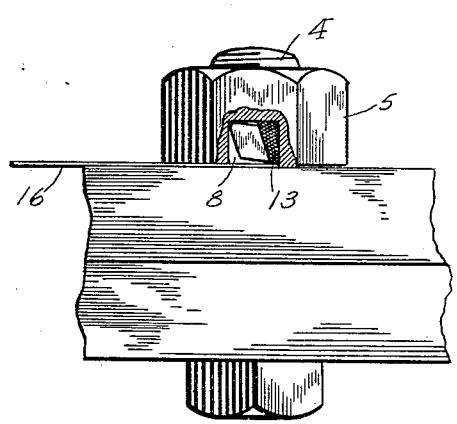
Figure 4:
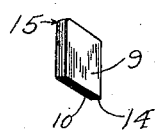
Figure 5:

In the accompanying drawings, Figure 1 is a vertical view partially in section of the invention, showing a spring in contact with the pawl. Fig. 2 is a similar view to Fig. 1, showing rubber or other yielding material in contact with the pawl. Fig. 3 is a bottom view of the nut, showing a vertical recess and a portion of the nut cut away to form a shoulder, and a passageway for a releasing key. Fig. 4 is a detailed perspective view of the pawl, and Fig. 5 is a detailed perspective view of the releasing key.

In the drawings, reference numerals 1 and 2 represent two ordinary parts which it is desired to fasten together, forming abutments for the head of a bolt, nut and lock, having an aperture therein to receive a bolt 3, the threaded end 4 of which projects beyond the surface of one of the parts.

A nut 5 threadably engages the projecting end 4 of the bolt and is provided on its face with a shouldered portion 6, leaving a space 7 intervening between the face of the nut and the part (1) which it is in contact with, when the nut is tightened. A vertical recess 8 is formed in the face of the nut to receive a pawl 9 which is provided with an inclined upper portion 10. The vertical recess 8 is made larger than the pawl, leaving a space 11 between one wall of the recess and the pawl, into which a U-shaped spring 12 is preferably inserted, or if desired, a rubber 13 or other yielding material can be inserted to provide means to exert a pressure against the pawl to normally force the point 14 below the face of the nut and in contact with one of the parts (or other abutment). The pawl fulcrums in the corner of the recess upon the end 15. A key 16 is provided to be inserted into the space 7 and forced into contact with the inclined portion 10 of the pawl to force the pawl 10 below the surface of the part (or other abutment) it is in contact with, when the nut can be readily unscrewed from the bolt.

The operation of my nut-lock is as follows:—The nut 5 is screwed down upon the bolt until the point 14 of the pawl is in contact with its abutment and the point is gradually forced underneath the face of the nut against the tension of the spring or other yielding material until the nut is tightened and its face is in contact with the abutment, as shown in Fig. 1. The point 14 of the pawl, by the tension of the spring or other yielding material, is forced to embed itself into its abutment and the tendency to loosen because of vibration and shocks is obviated. The nut cannot be removed without a key as the point of the pawl 14 will embed itself deeper in its abutment if it is attempted to unscrew or loosen it. If it is desired to take the nut off, the key 16 is used as described. Attention is called to the fact that a bolt with a right hand thread or a bolt with a left hand thread can be used with equal facility it being only necessary to reverse the pawl and change the running direction of the pitch of the thread in the nut from right to left or vice-versa. It will be understood that my improved locking device may be applied to a bolt head as well as to a nut and it is not my intention to limit the use of my invention to its application to a nut as it may be applied to a bolt head without deviating from my invention.

I claim:

A nut-lock comprising a bolt and a nut;

said nut being provided with a vertical recess with the upper corners thereof symmetrical, a reversible pawl adapted to fulcrum in either corner of said recess to impede rotation of the nut, yielding means inserted in said vertical recess to normally hold the pawl in yielding contact with an abutment.

In testimony whereof I affix my signature in presence of two witnesses.

WILLIAM S. OLD.

Witnesses:
B. F. LEWIS,
DAVID STEINER.